United States Patent [19]

Noji et al.

[11] 4,307,696

[45] Dec. 29, 1981

[54] ELECTRONIC CONTROL SYSTEM FOR AIR FUEL RATIO COMPENSATION IN HIGHLANDS

[75] Inventors: Akio Noji, Warabi; Junichi Kimura, Higashimurayama, both of Japan

[73] Assignee: Honda Giken Kogyo Kabushiki Kaisha, Tokyo, Japan

[21] Appl. No.: 120,738

[22] Filed: Feb. 12, 1980

[30] Foreign Application Priority Data

Feb. 16, 1979 [JP] Japan .................................. 54-017598

[51] Int. Cl.³ .............................................. F02B 3/00
[52] U.S. Cl. .................................... 123/585; 123/465; 123/588
[58] Field of Search ........................ 123/465, 585, 588

[56] References Cited

U.S. PATENT DOCUMENTS 3,738,343  6/1973  Zeyns .................................... 123/465
4,125,100  11/1978  Assenheimer ........................ 123/585
4,163,434  8/1979  Tsukamoto ........................... 123/588
4,187,821  2/1980  Zebli .................................... 123/588

Primary Examiner—Ronald B. Cox
Attorney, Agent, or Firm—Lyon & Lyon

[57] ABSTRACT

An electronic control system which electronically controls the air fuel ratio of a mixture being supplied to a gasoline engine in highlands. An orifice device is provided in a passage through which secondary air is supplied to the venturi section of the engine carburetor. An electronic control unit carries out programmed control of the orifice opening of the orifice device in response to the atmospheric pressure and the engine temperature to create a reference pressure. A further electronic control unit drives a second air control valve provided in the secondary air supply passage along a predetermined operating characteristic pattern in response to the difference between the reference pressure and an actual pressure present in the venturi section of the carburetor. A mixture having an optimum air fuel ratio corresponding to the atmospheric pressure can thus be supplied to the engine from the carburetor.

8 Claims, 15 Drawing Figures

ELECTRONIC CONTROL SYSTEM FOR AIR FUEL RATIO COMPENSATION IN HIGHLANDS

FIELD OF THE INVENTION

This invention relates to an electronic control system for air fuel ratio compensation in highlands, which automatically corrects the air fuel ratio of an air-fuel mixture obtained by the carburetor of a gasoline engine in response to changes in the atmospheric pressure in highlands.

DESCRIPTION OF THE PRIOR ART

In general, adjustment of a carburetor mounted in an automotive gasoline engine is carried out so as to obtain matching of the carburetor with the engine by determining points to which the caliber of the main nozzle, the opening of the throttle valve, etc. should be adjusted to obtain a best running state, through repeated trial running of an automobile which accommodates the engine, or by any other suitable measures. However, an automobile engine requires different air fuel ratios according to the running conditions of the automobile or the circumstances in which the automobile is running. Particularly when the automobile is running in a highland where a lower atmospheric pressure may prevail, an appropriate air fuel ratio may not be obtained, often resulting in that the engine comes into a much worse condition. To avoid this, it is necessary to compensate the air fuel ratio of the mixture being supplied from the carburetor according to the atmospheric pressure when the automobile is running in a highland.

Conventionally, an air bleed system has been widely used to compensate the air fuel ratio of a mixture being supplied to a gasoline engine. However, this type is not yet capable of supplying secondary air to the engine at a sufficient rate and therefore cannot produce satisfactory results in highlands. Another type of air fuel ratio compensator has conventionally been used as an exclusive high-ground compensator which employs an aneroid barometer and controls the amount of secondary air being supplied to the carbureted mixture in response to changes in the absolute pressure of the atmospheric air detected by the barometer. However, this compensator is not capable of performing accurate control due to its mechanical and single-stage control.

OBJECT AND SUMMARY OF THE INVENTION

It is therefore the object of the invention to provide an electronic control system for compensating in an accurate manner the air fuel ratio of an air-fuel mixture being supplied to a gasoline engine from the carburetor of the engine in highlands according to the atmospheric pressure, which employs a programmed electronic control system.

This object of the invention is achieved by providing an electronic air fuel ratio control system which comprises a passage for supplying secondary air to the venturi section of a gasoline engine, an orifice device arranged in the secondary air supply passage and including an orifice having a variable opening, a first electronic control unit for regulating the orifice opening of the orifice device, a differential pressure detector for detecting the difference between a reference pressure created by the first electronic control unit and an actual pressure present in the venturi section, a secondary air supply control valve arranged downstream of the orifice device in the secondary air supply passage, and a second electronic control unit for driving the secondary air supply control valve along a predetermined operating characteristic pattern in response to a signal representing a detected pressure difference from the differential pressure detector. The first electronic control unit has a program recorded therein for controlling the orifice opening of the orifice device as a function of atmospheric pressure and engine temperature and regulates the orifice opening of the orifice device in accordance with an actual atmospheric pressure and an actual engine temperature to provide a reference pressure corresponding to the actual atmospheric pressure and the actual engine temperature in a zone downstream of the orifice device in the secondary air supply passage. The second electronic control unit drives the secondary air supply control valve so that the difference between the reference pressure and the actual pressure in the venturi section becomes zero. Control is thus carried out to supply an air-fuel mixture having an optimum air fuel ratio corresponding to the atmospheric pressure and the engine temperature as well as the engine load from the carburetor to the engine.

DETAILED DESCRIPTION

Figure 1:
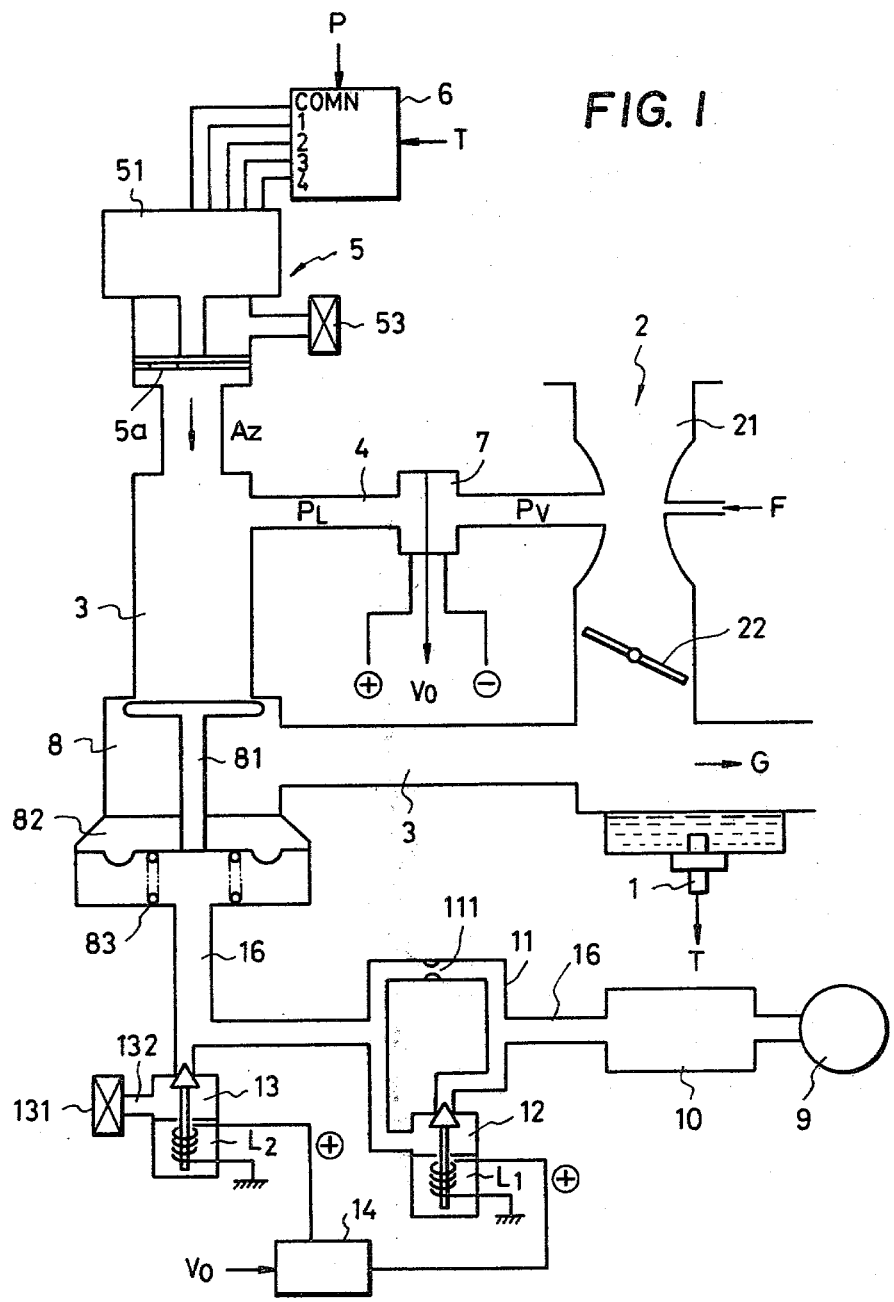
FIG. 1 is a diagrammatic illustration of an electronic air fuel ratio control system according to one embodiment of the invention.

Referring now to the drawings, one embodiment of the invention will be described in detail. FIG. 1 shows the whole structure of the electronic air fuel ratio control system according to the invention. Reference numeral 6 designates an orifice control unit which is supplied with a signal P representing an atmospheric pressure detected by an atmospheric pressure sensor (not shown in FIG. 1) and a signal T representing an engine temperature such as that of engine cooling water detected by a temperature sensor 1. The orifice control unit 6 is connected with an orifice device 5 arranged across the air inlet of a secondary air supply passage 3 which bypasses air to a zone downstream of a throttle valve 22 located below the venturi 21 of a carburetor 2. The orifice control unit 6 drives a pulse motor 51 provided in the orifice device 5 in response to the signals P and T to regulate the openings of the orifice 5a of the orifice device 5 in accordance with a predetermined program. A differential pressure sensor 7 is provided between the secondary air supply passage 3 and the venturi 21 to detect the difference between a pressure $P_L$ present in the passage 3 and a pressure present in the venturi 21. Provided downstream of the orifice device 5 in the secondary air supply passage 3 is an air valve 8 which comprises a valve body 81, a diaphragm 82 secured to the valve body 81 and a spring 83 urging the valve body 81 via the diaphragm 82 in a valve-closing direction. A closed passage 16 is provided in communication with the air valve 8, at an end of which is provided an air valve driving device comprising a vaccum pump 9 and a surge tank 10 for smoothing the output of the vaccum pump 9. Interposed between the air valve 8 and the surge tank 10 is a circuit 11 including a throttle 111. A solenoid valve 12 is provided across the circuit 8 and in parallel with the throttle 111. A further solenoid valve 13 is provided in communication with the portion of the closed passage 16 between the circuit 11 and the air valve 18. The solenoid valve 13 includes a port 132 which communicates with the atmosphere via a filter 131. These solenoid valves 12 and 13, which are permanently kept closed except when they are driven, are electrically connected with a differential pressure control unit 14 which drives the solenoid valves 12 and 13 along a predetermined operating characteristic pattern in response to a detected differential pressure signal $V_O$ supplied from the differential pressure sensor 7.

In FIG. 1, symbol F designates fuel being fed to the venturi 21 of the carburetor 2, and G a mixture being supplied to the cylinders of an engine, not shown, respectively.

Figure 2:
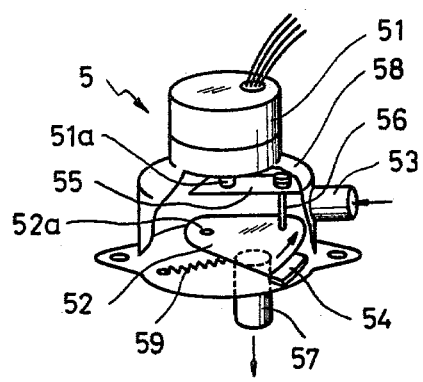
FIG. 2 is a perspective view of the orifice device used in the system of FIG. 1.

FIG. 2 illustrates in detail the orifice device 5 used in the system of FIG. 1. An inlet pipe 53, an outlet pipe 57 and a housing 58 constitute part of the secondary air supply passage 3 of the system of FIG. 1. In the housing 58, the pulse motor 51 has an output shaft 51a which is connected with a valve body 52 pivoted to a fixed shaft 52a, through coupling elements 55 and 56. The valve body 52 is disposed to open or close the outlet pipe 57 and is pulled in one direction by a spring 59. A reed switch 54 is arranged in facing relation to a pivotal end of the valve body 52 to supply a base position signal (COMN) to the orifice control unit 6 when the valve body 52 is a predetermined base position.

Figure 3:
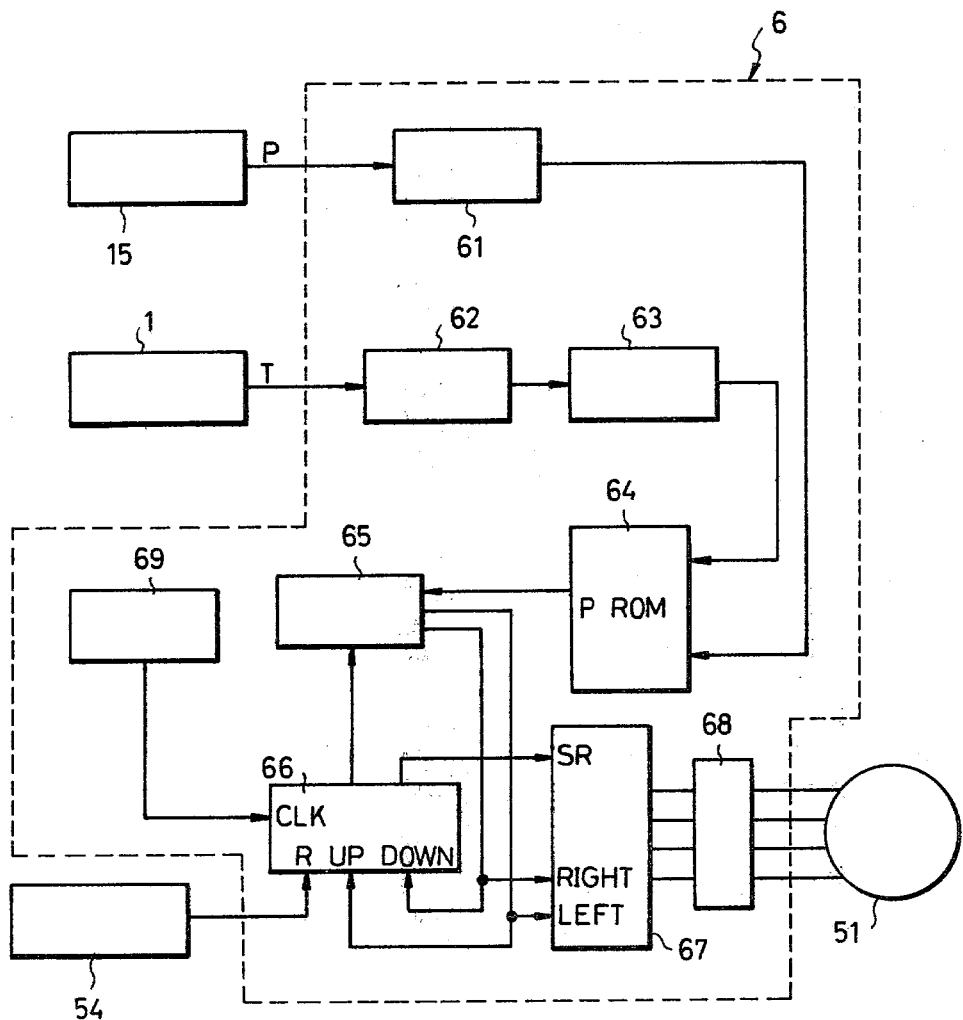
FIG. 3 is a block diagram of the first or orifice control unit used in the system of FIG. 1.

FIG. 3 shows an example of the structure of the aforementioned orifice control unit 6. An AD (analog-to-digital) converter 61 is connected with the output terminal of the atmospheric pressure sensor 15 to convert a detected value signal P supplied from the sensor 15 into a digital signal. A further AD converter 63 is connected with the output terminal of the temperature sensor 1 via a linear converter 62 which converts the output of the sensor 1 into an analog signal directly proportional to the temperature, to convert a detected value signal from the temperature sensor 1 into a digital signal. The output terminals of these converters 61 and 63 are connected with the input terminals of a programmable read only memory (P ROM) 64 in which is recorded a program for producing a pulse signal corresponding to the digital signals from the converters 61 and 63. P ROM 64 produces a control signal (pulse signal) in accordance with the program, in response to the outputs from the converters 61 and 63. P ROM 64 is connected with a driver circuit 68 for driving the pulse motor 51 of the orifice device 5, by way of a coincidence circuit 65, a reversible counter 66 and a left and right shift register 67. The number of output pulses from P ROM 64 is compared by the coincidence circuit 65 with the number of pulses counted by the reversible counter 66 as a function of the operation of the pulse motor 51. More specifically, the counter 66 is supplied with a clock signal having a predetermined pulse width from a clock generator 69, and is arranged to have its clearing terminal supplied with a detected base position signal from the reed switch 54 of the orifice device 5 to have its stored data cleared thereby. The counter 66 starts counting output pulses from P ROM 64 over the pulse time of the clock signal from zero upon being supplied with the detected base position signal. The counted pulse number is compared with the number of the output pulses from P ROM 64 by means of the coincidence circuit 65. A command is given by the coincidence circuit 65 to the up counting terminal or down counting terminal of the counter 66 in dependence on the difference between the two numbers. The shift register 67 carries out shifting action in left or right direction by an amount corresponding to the number of pulses counted by the counter 66 to cause the driver 68 to rotate the pulse motor 51 in a required direction in accordance with the shifting direction and amount of the shift register 67. When the output pulses from P ROM 64 and the counted pulses of the counter 66 agree in number with each other, the coincidence circuit 65 produces a coincidence signal, and accordingly the shift register 67 gives a command to the driver 68 to interrupt the operation of the pulse motor 51.

Figure 4:
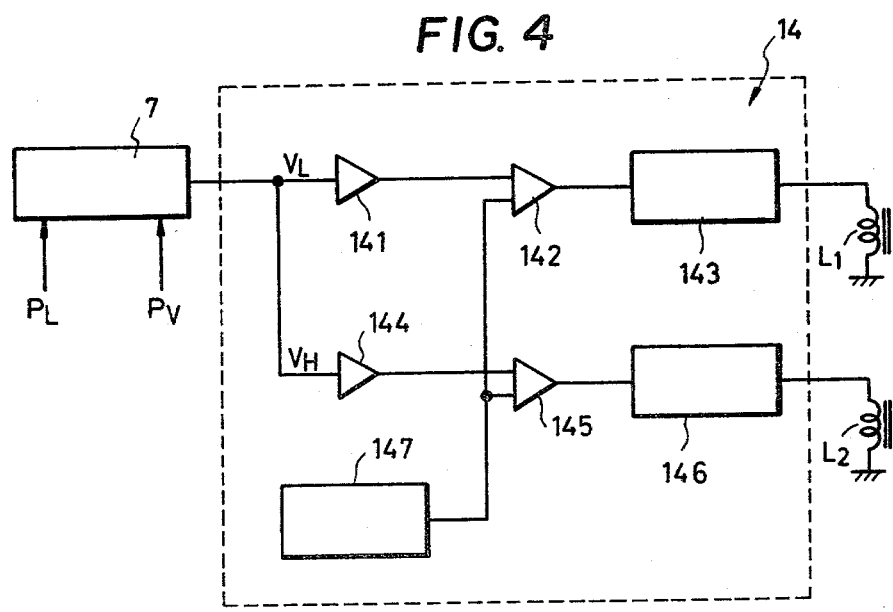
FIG. 4 is a block diagram of the second or differential pressure control unit used in the system of FIG. 1.

FIG. 4 shows an example of the structure of the differential pressure control unit 14. An amplifier 141, a gate 142 and a driver circuit 143 constitute a first control system. A low output voltage $V_L$ representing a low detected value (an electric voltage lower than the base voltage hereinafter referred to) from the differential pressure sensor 7 is fed to the driver circuit 143 via the amplifier 141 and the gate 142. When supplied with this output voltage $V_L$, the driver circuit 143 energizes the coil $L_1$ of the solenoid valve 12 in response to the output $V_L$. An amplifier 144, a gate 145 and a driver circuit 146 constitute a second control system. A high output voltage $V_H$ representing a high detected value (an electric voltage higher than the base voltage) is fed to the driver circuit 146 via the amplifier 144 and the gate 145 to cause the driver circuit 146 to energize the coil $L_2$ of the solenoid valve 13 in response to the output $V_H$. In FIG. 4, reference numeral 147 denotes a gate pulse generator for issuing a command for opening or closing the gates 142 and 145.

Figure 5:
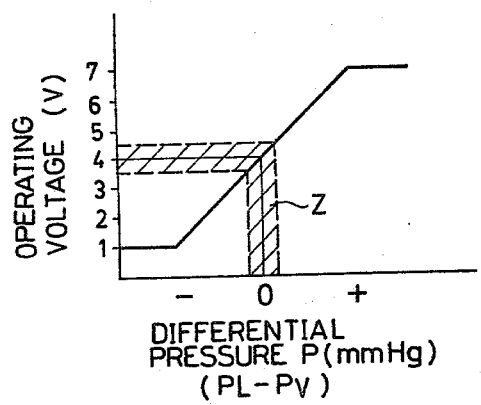
FIG. 5 is a graph showing the control characteristic of the second control unit.
Figure 6:
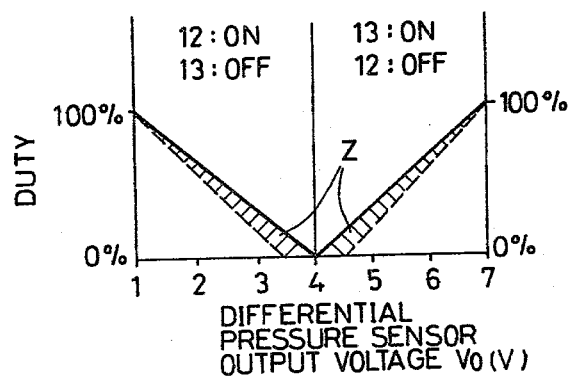
FIG. 6 is a graph showing the operating characteristic of the solenoid valves used in the second control unit.

The differential pressure sensor 7 and the differential pressure control unit 14 cooperate to carry out a control action on the basis of operating voltages as shown in FIG. 5. A predetermined voltage is provided as a base voltage when the differential pressure is zero ($P_L = P_V$) (In FIG. 5, four volt is chosen as the base voltage). The differential pressure control unit 14 is arranged to provide an insensitive zone (tolerance zone) about the base position of the sensor 7 so that the influence of fluctuations in the control system can be minimized to achieve a stable control action. The differential pressure control unit 14 is adapted to selectively drive the solenoid valve 12 or 13 in accordance with the operating characteristic shown in FIG. 6. That is, the solenoid valves 12 and 13 each have a duty varying with the level of the output voltage $V_O$ of the differential pressure sensor 7 in such a manner that the duty of each solenoid valve, i.e., the solenoid-energized rate is larger as the difference between $P_L$ and $P_V$ is larger, while the duty is smaller as the difference becomes smaller or approaches zero. Thus, it is possible to achieve air fuel ratio control with excellent responsiveness and stability. An ordinary type pressure sensor such as a semiconductor pressure sensor may be used as the differential pressure sensor 7.

Figure 7:
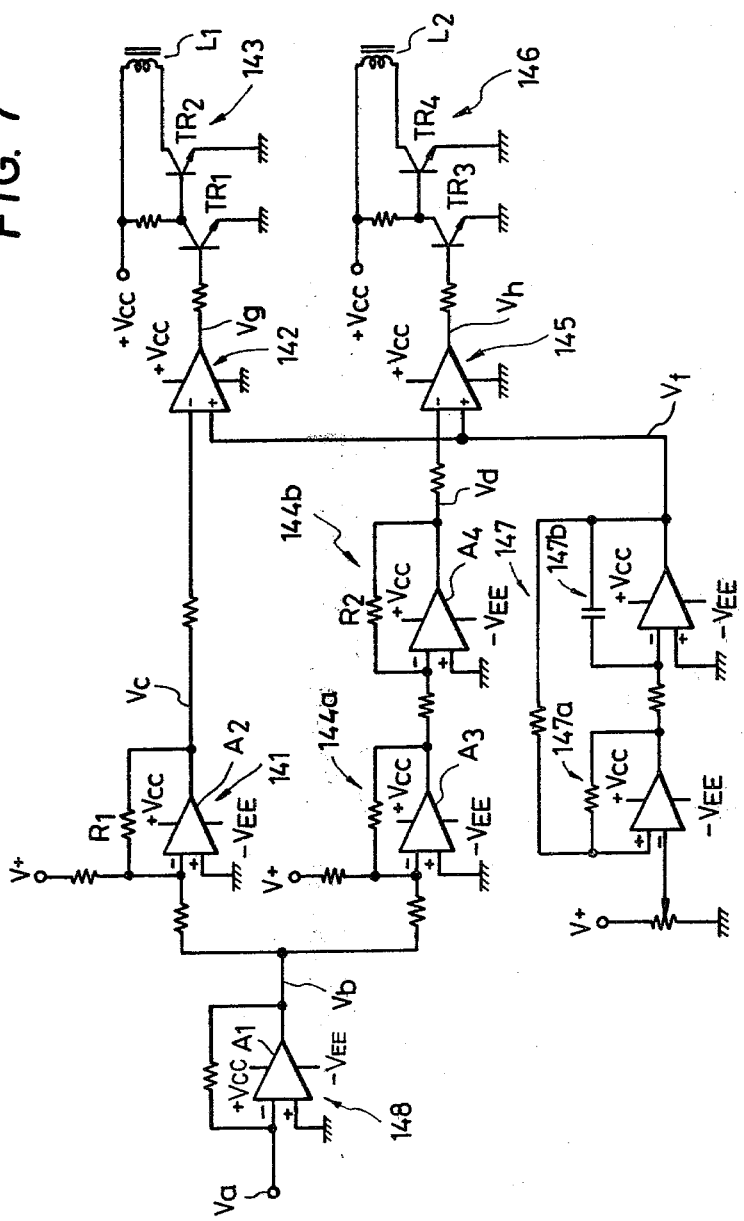
FIG. 7 is a circuit diagram of the second control unit.
Figure 8:
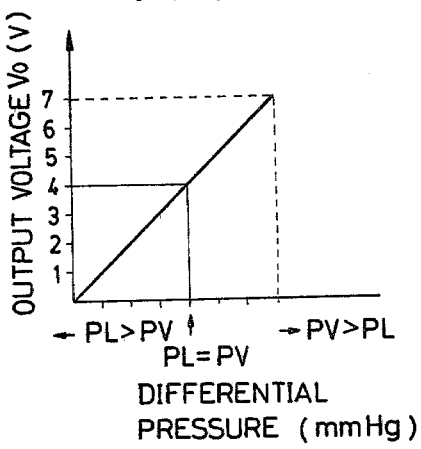
FIG. 8 is the output characteristic of the differential pressure sensor used in the system of FIG. 1.
Figure 9:
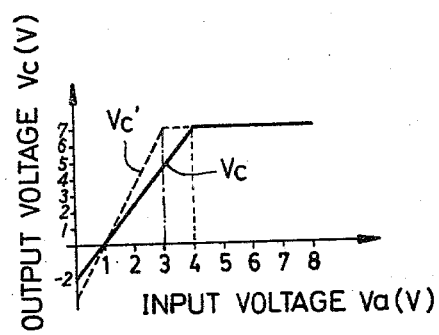
FIG. 9 is a graph showing the output characteristic of a first amplifier used in the circuit of FIG. 7.
Figure 10:
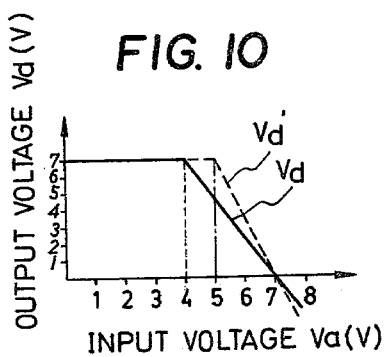
FIG. 10 is a graph showing the output characteristic of a second amplifier used in the same circuit.

FIG. 7 illustrates an example of the electric circuit embodying the structure of the differential pressure control unit 14 shown in FIG. 4. The differential pressure sensor 7 produces a DC voltage in accordance with a characteristic shown in FIG. 8 which is applied as an input voltage Va to the inverting input terminal of an inverted amplifier 148 shown in FIG. 7. The inverted output voltage Vb supplied from the amplifier 148 is applied to amplifiers 141 and 144a, 144b each constituting an inverted amplifier. DC voltages Vc and Vd are produced at the output terminals of the amplifiers 141 and 144b which are in relationships shown in FIGS. 9 and 10 with respect to the input voltage Va. As is learned from these graphs, the amplifiers 141 and 144b have their gains set so that the output voltages Vc and Vd have the maximum or saturation values when the input voltage exceeds four volt and drops below four volt, respectively, as indicated in solid lines. However, different values Vc' and Vd' may be obtained by varying the negative feedback resistances R1 and R2, as indicated in dotted lines, respectively, to provide the aforementioned insensitive zone Z.

Figure 11:
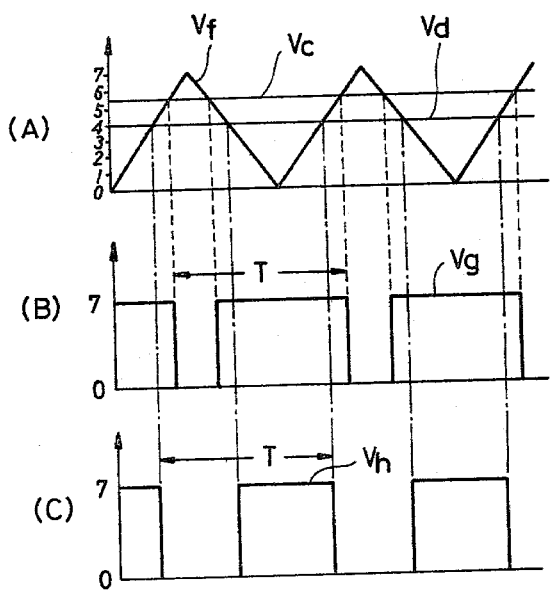
FIG. 11 is a graph showing the output characteristics of gates used in the same circuit.

The gate pulse generator 147 is composed of a Schmitt trigger circuit 147a and an integrator 147b and supplies a triangular pulse voltage Vf having a constant period T as shown in FIG. 11(A) to the comparators 142 and 145. Output voltages Vg and Vh are supplied from the comparators 142 and 145, as shown, respectively, in FIG. 11(B) and (C) provided that the respective input voltages Vc and Vd then assume values shown in FIG. 11(A). As noted from the graphs in FIG. 11, the voltages Vg and Vh have pulse widths just proportional, respectively, to the values of the output voltages Vc and Vd of the inverted amplifiers 141 and 144 (They have a constant period T). These output pulses Vg and Vh are supplied to driver circuits 143 and 146 composed respectively of transistors $TR_1$, $TR_2$ and $TR_3$, $TR_4$ which circuits in turn energize the coils $L_1$ and $L_2$ of the solenoid valves 12 and 13 with pulse widths inversely proportional to the pulse widths of the output pulses Vg and Vh, thus to obtain valve opening actions with the duties shown in FIG. 6. In the circuit of FIG. 7, the amplifiers A1–A4 and other amplifiers and gates may advantageously be composed of IC operational amplifiers.

The operation of the electronic control system for air fuel ratio compensation in highlands according to the invention arranged and constructed as above will be now described.

Figure 12:
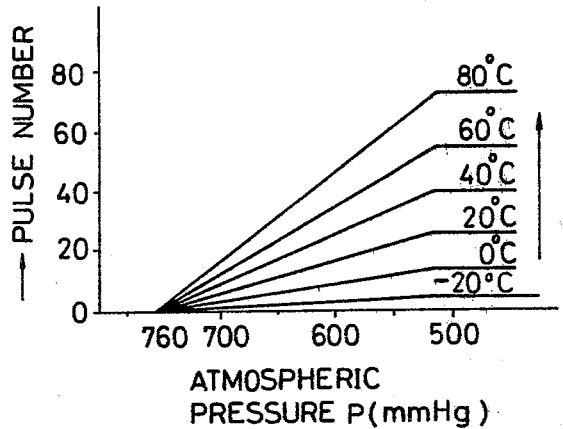
FIG. 12 is a graph showing the characteristic of P ROM used in the system of FIG. 3.
Figure 13:
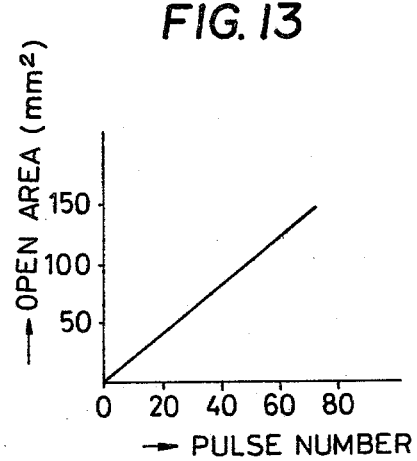
FIG. 13 is a graph showing the operating characteristic of the orifice device shown in FIGS. 1 and 2.

First, the orifice control unit 6 actuates the orifice devices 5 in response to a detected atmospheric pressure signal P from the atmospheric pressure sensor 15 and a detected temperature signal T from the temperature sensor 1 so that the open area $A_Z$ of the orifice 5a is adjusted to a value best suited for the values of the signals P and T. In P ROM 64 of the orifice control unit 6 are previously stored the numbers of drive pulses for the pulse motor 51 of the orifice device 5 which correspond to the detected atmospheric pressure signal P of the atmospheric pressure sensor 15 with the detected temperature signal T of the temperature sensor 1 as a parameter, as shown in FIG. 12. The pulse motor 51 is driven in a direction corresponding to the shifting direction of the shift register 67 in the aforementioned manner. The open area of the orifice 5a of the orifice device 5 and the drive pulse number therefor are set in a relationship proportional to each other as shown in FIG. 13.

Figure 14:
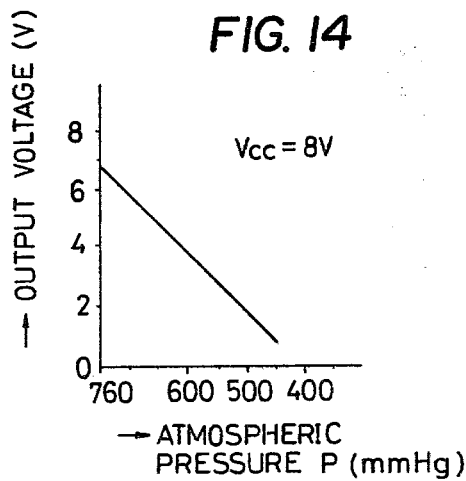
FIG. 14 is a graph showing the output characteristic of the atmospheric sensor used in the system of FIG. 1.
Figure 15:
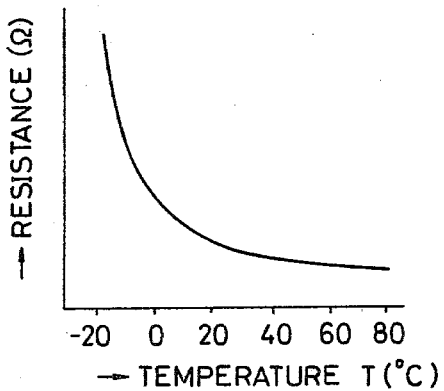
FIG. 15 is a graph showing the characteristic of the temperature sensor used in the same system.

The atmospheric pressure sensor 15 may be formed of a conventional type such as a semiconductor pressure whose output characteristic is shown in FIG. 14. The temperature sensor 1 may be formed of a thermistor whose output characteristic is shown in FIG. 15.

Then, when the open area of the orifice 5a in the orifice device 5 has thus been determined and adjusted, the differential pressure control unit 14 acts to regulate the solenoid valve 12 or 13 to adjust the lift of the valve body 81 of the air valve 8 provided in the secondary air supply passage 3 so that the pressure $P_L$ in the secondary air supply passage 3 and the pressure $P_V$ in the venturi 21 may agree to each other.

The differential pressure sensor 7 is adapted to produce an output voltage $V_H$ higher than the base voltage when the pressure $P_L$ is larger than the pressure $P_V$. Then, the differential pressure control unit 14 is actuated by the voltage $V_H$ to cause the solenoid valve 13 to open so that external air is introduced into the closed passage 16 through the valve 13 to cause a decrease in the negative pressure produced by the vaccum pump 9 and applied to the diaphragm 82 of the air valve 8. The valve 8 is then closed to interrupt the supply of secondary air to a zone downstream of the throttle valve 21 of the carburetor 2. When driven by the control unit 14, the solenoid valve 13 performs an intermittently opening action since the gate 145 in the control unit 14 is intermittently opened by pulses from the pulse generator 147. On the other hand, when $P_L$ is smaller than $P_V$, the differential pressure sensor 7 produces an output voltage $V_L$ lower than the base voltage. Accordingly, the solenoid valve 12 is likewise intermittently opened to cause an increase in the negative pressure produced by the vaccum pump 9 and applied to the diaphragm 81 to open the air valve 8 so that secondary air is supplied to a zone downstream of the throttle valve 21 of the carburetor 2.

Incidentally, as the negative pressure applied to the diaphragm 82 may be used a negative pressure present in the manifold of the engine provided with a surge tank, in place of that supplied from the vaccum pump 9 used in the above-mentioned embodiment. Alternatively, an ordinary positive pressure pump may be also used in a manner that the spring 83 of the air valve 8 is arranged to urge the opposite side of the diaphragm 82 to that urged thereby in FIG. 1.

In the above-mentioned manner, the differential pressure control unit 14 selectively drives the solenoid valve 12 or 13 in response to the output voltage $V_O$ of the differential pressure sensor 7 to regulate the air valve 8 so as to open or close the secondary air supply passage 7 until the relationship of $P_L = P_V$ is attained.

By virtue of the above-described arrangement, it is possible according to the invention to achieve accurate and stable high-ground compensation of the air fuel ratio in the mixture obtained by the engine carburetor in an electronically automatic manner to obtain an optimum air fuel ratio best suited for the atmospheric pressure then prevailing.

The electronic control system for air fuel ratio compensation in highlands according to the invention is adapted to be automatically disconnected from the carburetor system in a manner that the orifice device 5 completely blocks the secondary air supply passage when the automobile is running in a low land. Thus, the present system has no unfavorable influence upon the air fuel ratio control in ordinary running.

It is to be understood that the foregoing description relates to a preferred embodiment of the invention and that various changes and modifications may be made in the invention without departing from the spirit and scope thereof.

What is claimed is:

1. An electronic control system for high-ground compensation of the air fuel ratio of an air-fuel mixture for a gasoline engine of the type including a carburetor having a venturi and a throttle valve, the system comprising:

a passage for supplying secondary air to a zone downstream of the throttle valve of said carburetor;

an orifice device arranged across said passage and including an orifice having a variable opening;

first electronic control means for regulating the orifice opening of said orifice device, the first electronic control means having a program recorded therein for controlling the orifice opening of the orifice device as a function of atmospheric pressure and engine temperature, the first electronic control means being responsive to an actual atmospheric pressure and an actual engine temperature to drive the orifice device in accordance with the program to adjust the orifice opening thereof, to thereby provide a reference pressure corresponding to said actual atmospheric pressure and said actual engine temperature in a zone downstream of said orifice device in said passage;

a differential pressure detector for detecting the difference between said reference pressure and an actual pressure present in the venturi of said carburetor to produce a detected differential pressure signal;

a valve arranged downstream of said orifice device in said passage for controlling the quantity of secondary air being supplied to said zone downstream of the throttle valve; and second electronic control means responsive to a differential pressure signal produced by said differential pressure detector to drive said secondary air supply control valve in accordance with a predetermined operating characteristic pattern, the second electronic control means being adapted to operate so that the difference between the base pressure and the actual pressure in the venturi becomes zero;

whereby an air-fuel mixture obtained by the carburetor has an optimum air fuel ratio corresponding to the actual atmospheric pressure, engine temperature and engine load.

2. The electronic control system as claimed in claim 1, wherein said orifice device comprises: a secondary air passage; a valve body displaceably disposed to regulate the opening of said secondary air passage; and a pulse motor operable to displace said valve body for varying the opening of said secondary air passage.

3. The electronic control system as claimed in claim 2, wherein said first electronic control means comprises: a first sensor for detecting an atmospheric pressure to produce an analog signal corresponding to the detected atmospheric pressure; a second sensor for detecting an engine temperature to produce an analog signal corresponding to the detected engine temperature; a first AD converter for converting the analog signal from said first sensor into a digital signal; a second AD converter for converting the analog signal from said second sensor into a digital signal; a programmable read only memory responsive to outputs from said first and second AD converters in accordance with a program recorded therein; a reversible counter for counting the pulses of the output pulse signal from said programmable read only memory with respect to a predetermined base position of said valve body of said orifice device; a coincidence circuit for comparing between the pulse number of the output pulse signal from said programmable read only memory and a pulse number counted by said reversible counter; a left and right shift register for shifting information retained therein in one or the reverse direction in response to a signal from said coincidence circuit representing the difference between the pulse numbers; and a driver circuit for driving the pulse motor of said orifice device in accordance with the shifting direction and amount of said shift register; wherein said reversible counter has a counting direction thereof changed into an up direction or a down direction in response to the difference signal from said coincidence circuit, said reversible counter being arranged to be cleared when said orifice device has a predetermined orifice opening, said left and right shift register being adapted to supply said driver circuit with a signal for interrupting the operation of said pulse motor when said coincidence circuit produces a signal representing the coincidence between said two pulse numbers.

4. The electronic control system as claimed in claim 3, wherein said orifice device includes a position detecting means arranged to detect the displacement of said valve body, said position detecting means being adapted to supply a base position signal to said reversible counter when said valve body is in a predetermined base position, said reversible counter being adapted to be cleared by said base position signal.

5. The electronic control system as claimed in claim 1, wherein said secondary air supply control valve comprises a valve body disposed to open or close said secondary air supply passage, and means for pneumatically actuating said valve body.

6. The electronic control system as claimed in claim 5, wherein said second electronic control means comprises: a closed passage communicating with said pneumatic actuating means of said secondary air supply control valve; a vaccum pump communicating with said closed passage; a throttle provided between said secondary air supply control valve and said vaccum pump in said closed passage; means for smoothing the output of said vaccum pump; a first solenoid valve arranged in parallel with said throttle to regulate the supply of the output from said vaccum pump to said secondary air supply control valve; a second solenoid valve disposed to allow communication of the interior of said closed passage with the atmosphere; and means for selectively actuating said first and second solenoid valves in response to a detected differential pressure signal from said differential pressure detector.

7. The electronic control system as claimed in claim 1, wherein said differential pressure detector is adapted to produce a predetermined electric voltage as a base voltage when the differential pressure between said reference pressure and an actual pressure in the venturi is zero, a tolerance zone being provided about the zero differential pressure and the base electric voltage.

8. The electronic control system as claimed in claim 1, 5, 6 or 7, wherein said second electronic control means is adapted to drive said secondary air supply control valve in accordance with a duty varying in proportion to the difference between the reference pressure and an actual pressure in the venturi.

* * * * *